United States Patent [19]

Kurei

[11] 4,264,170
[45] Apr. 28, 1981

[54] MIRROR SHOCK ABSORBING DEVICE IN SINGLE LENS REFLEX CAMERA

[75] Inventor: Hiroshi Kurei, Kawagoe, Japan

[73] Assignee: Asahi Kogaku Kogyo Kabushiki Kaisha, Tokyo, Japan

[21] Appl. No.: 955,446

[22] Filed: Oct. 27, 1978

[30] Foreign Application Priority Data

Oct. 28, 1977 [JP] Japan .................... 52-144648[U]

[51] Int. Cl.³ .............................................. G03B 19/12
[52] U.S. Cl. ................................... 354/152; 354/202
[58] Field of Search ............................ 354/152–156, 354/202; 267/177, 157, 173

[56] References Cited

U.S. PATENT DOCUMENTS

| 3,568,585 | 3/1971 | Ishizaka | 354/156 |
| 3,653,311 | 4/1972 | Sato | 354/156 |
| 3,738,246 | 6/1973 | Sato | 354/202 |
| 3,860,941 | 1/1975 | Fukuda | 354/156 |

Primary Examiner—J. V. Truhe
Assistant Examiner—Shelley Wade
Attorney, Agent, or Firm—Sughrue, Rothwell, Mion, Zinn and Macpeak

[57] ABSTRACT

A shock absorbing device for a mirror in a single lens reflex camera having a shock absorbing lever with a stopper portion adapted to set the lower position of the mirror for observing through a view finder of the camera. A first spring provides suitable friction for the lever with respect to a stationary member. A second spring acts on the lever to cause the stopper portion of a mirror holder to stop at a predetermined position against of a mirror lowering force. The first and second springs may be replaced by one compression and torsion coil spring having an adjustable elastic force.

4 Claims, 2 Drawing Figures

MIRROR SHOCK ABSORBING DEVICE IN SINGLE LENS REFLEX CAMERA

BACKGROUND OF THE INVENTION

In a single lens reflex camera, two states of observing an object through the view finder and of actually photographing the object are switched by elevating and lowering the mirror in the camera. This switching operation is the cause which generates operating sound and provides a shock to the camera. In very slow shutter speeds, the operator may feel the camera "jump" as the mirror is raised, thereby destroying the picture.

In the prior art a number of concepts have been attempted to reduce the shock or recoil in the camera as the mirror is switched. One technique is to use an air piston that damps the energy of mirror movement. This technique, while effective, is expensive and not designed for miniaturation in smaller SLR camera designs.

Also, since the mirror must be reliably switched for each shutter depression, any system for absorbing shock must work without fail over a very high repetition rate throughout the life of the camera. Moreover, in the case of motor driven shutter operation, the sequence is repeated very quickly, for example, 5 frames per second. Hence, the mechanism for damping shock must be quick acting.

SUMMARY OF THE INVENTION

Accordingly, an object of this invention is to provide a shock absorbing device which alleviates the operating sound and shock which are caused when the mirror is operated.

It is another object of this invention to provide a shock absorbing device that alleviates the sound and shock of SLR camera mirror movement that is simple yet reliable and inexpensive.

These and other objects of this invention are accomplished by using a first spring providing friction for the shock absorbing lever with respect to a stationary member. A second spring acts on the lever to cause the stopper portion of a mirror of a mirror holder to stop at a predetermined position.

BRIEF DESCRIPTION OF THE INVENTION

DESCRIPTION OF THE PREFERRED EMBODIMENT

Figure 1:
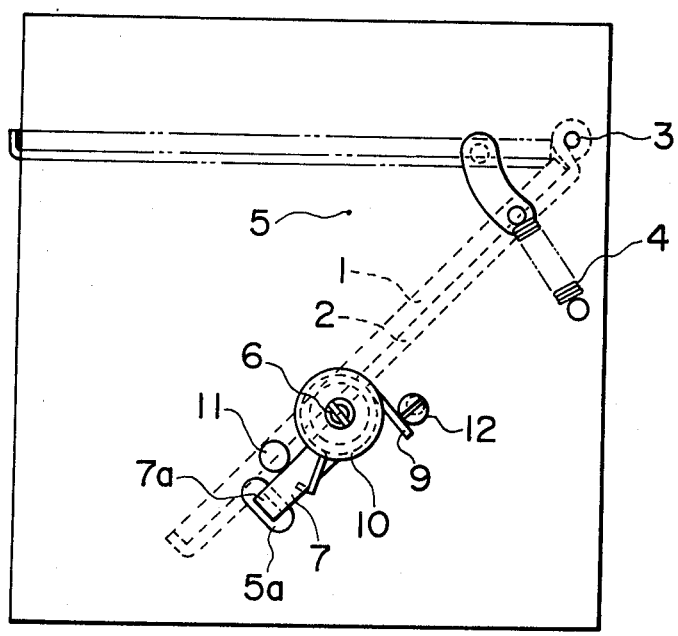
FIG. 1 is a plan view showing the preferred embodiment of this invention.
Figure 2:
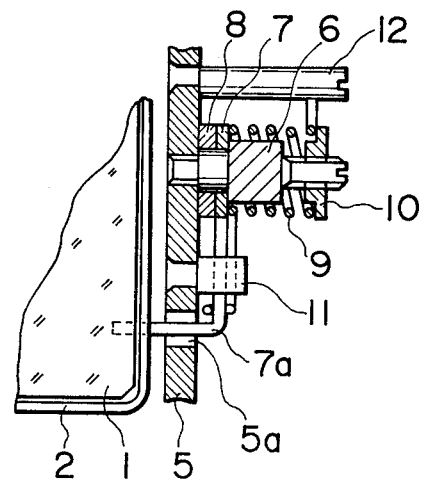
FIG. 2 is a sectional view showing the preferred embodiment of this invention.

One preferred embodiment of the invention will now be described with reference to the accompanying drawings. Referring to FIGS. 1 and 2, a mirror 1 is fixedly secured to a mirror holder 2. The mirror holder 2 is swung around its axis 3 to the position indicated by the two-dot chain line against the elastic force of a restoring spring 4 by a mirror operating mechanism (not shown). After the completion of an exposure, it is restored to its initial position shown by dotted line by the restoring spring 4. A shock absorbing lever 7 is rotatably provided on a mirror box 5 by means of a shaft 6. A frictional member 8 is inserted between the mirror box 5 and the lever 7.

The shock absorbing lever 7 has a stopper 7a at one end which protrudes through a hole 5a of the mirror box 5 into the operating region of the mirror holder 2. A spring 9 serving as a compression spring and a torsion coil spring is placed over the shaft 6 and is retained by a nut 10. The force of the compression spring can be adjusted by turning the nut 10. One end portion of the torsion coil spring is hooked on the shock absorbing lever 7 to turn the latter 7 clockwise, and the other end portion is hooked on an eccentric pin 12 secured to the mirror box. The clockwise turning force of the shock absorbing lever 7 can be adjusted by the eccentric pin. The clockwise movement of the shock absorber 7 is stopped by a stopper pin 11 to determine the lower stop position of the mirror holder 2.

Now, consider the case where the frictional force of the compression spring 9 does not act on the lever 7. In this case, the load which occurs when the mirror is lowered is the composite force (A+B) of the restoring force A of the restoring spring 4 and an inertial force B accompanying the operation. The force which counteracts the composite force is the force C of the torsion coil spring of the spring 9. In general, A<<B, and therefore the force balance is as A<<C <(A+B).

Thus, when the mirror is lowered, the shock absorbing lever 7 is turned counterclockwise to absorb the mirror lowering energy. When the lever 7 is turned clockwise to return to its initial position, the mirror lowering inertial force B has been lost and the restoring force D at that time is (C−A). Since C>>A, then D>>A. Accordingly, the mirror holder 2 runs over the lower stop position and is lowered again. This operation is repeatedly carried out; that is, the mirror holder is stopped through damped oscillation. If the damped oscillation lasts for a long time, the shock caused by the operation of the camera is felt by the hand. This, as mentioned herein, can be destructive in some operations. Furthermore, if photographing is carried out at high speed with the camera connected to a motor drive device, the stability of the image in the finder may be lost because the mirror may rebound upward.

In view of the foregoing, in the present invention, the frictional force of the compression spring is utilized to absorb and dissipate the inertial force caused when the mirror is lowered. This is shown with respect to FIG. 2. With the aid of the compression force of the spring 9, the frictional force E of a frictional member 8 is imparted to the shock absorbing lever 7, and C>E. Therefore, the force balance is: (C+E)<(A+B). As B has been lost when the lever is returned after absorbing the inertial energy, the force balance is as A<(C−E). Therefore, if the values C and E are so set up that C'E is slightly greater than A, mirror holder rebound can be damped quickly, which eliminates the above-described difficulty.

With the values C and E adjusted, the optimum value of force balance is obtained by using only one spring. Hence, the single spring shown can be replaced by independent compression and torsion coil springs.

As was described above, according to this invention, with the simple arrangement, the mirror lowering energy is absorbed, and the energy thus absorbed is dissipated through friction. Therefore, mirror rebound is quickly damped and stopped. This leads to elimination of the unpleasant feeling due to such mirror movement. Even if the camera is connected to a motor drive device and the number of picture frames photographed per unit time is increased, the image in the finder can be maintained stable. The invention has been described with reference to the case where the mirror is lowered; however, it is obvious that the technical concept of the invention can be applied to the case also where the mirror is elevated.

It is apparent that modifications of this invention are possible without departing from the essential aspects disclosed herein.

What is claimed is:

1. A shock-absorbing device for a mirror in a single lens reflex camera, comprising:
    a shock-absorbing lever having a stopper portion which, at a first position, defines a lower position of the mirror at which observation through a camera view finder can be effectuated;
    a first spring means for urging said shock-absorbing lever toward said first position;
    a stationary member;
    a frictional member disposed between said stationary member and said shock-absorbing lever for imparting friction to said shock-absorbing lever;
    a compression spring means for urging said shock-absorbing lever toward said stationary member, the force of said compression spring determining the amount of friction imparted to said shock-absorbing lever by said frictional member.

2. A shock-absorbing device as defined in claim 1, further comprising means for adjusting the compression force of said compression spring means to thereby control the amount of friction imparted to said shock-absorbing lever by said frictional member.

3. The shock-absorbing device as defind in claim 2, further comprising means for adjusting the force exerted on said shock-absorbing lever by said first spring means.

4. The shock-absorbing devices defined in any one of claims 1-3, wherein said first spring means and said compression spring means comprise a single integral spring member.

* * * * *